(12) United States Patent
Liu

(10) Patent No.: US 11,076,311 B2
(45) Date of Patent: Jul. 27, 2021

(54) METHODS AND DEVICES FOR MEASURING CELL SIGNAL QUALITY

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 6 days.

(21) Appl. No.: 16/655,502

(22) Filed: Oct. 17, 2019

(65) Prior Publication Data

US 2020/0053587 A1 Feb. 13, 2020

Related U.S. Application Data

(63) Continuation of application No. PCT/CN2017/088082, filed on Jun. 13, 2017.

(51) Int. Cl.
*H04W 24/10* (2009.01)
*H04B 17/327* (2015.01)
*H04J 11/00* (2006.01)

(52) U.S. Cl.
CPC .......... *H04W 24/10* (2013.01); *H04B 17/327* (2015.01); *H04J 11/0073* (2013.01); *H04J 11/0076* (2013.01); *H04J 11/0079* (2013.01)

(58) Field of Classification Search
CPC .... H04W 24/10; H04W 56/00; H04B 17/327; H04B 17/309; H04J 11/0073; H04J 11/0076; H04J 11/0079; H04J 11/0069; H04L 5/0048
See application file for complete search history.

(56) References Cited

U.S. PATENT DOCUMENTS

| 2010/0130202 | A1 | 5/2010 | Yu | |
|---|---|---|---|---|
| 2017/0223558 | A1* | 8/2017 | Deng | ............... H04W 24/10 |
| 2020/0022126 | A1* | 1/2020 | You | ............... H04L 5/0053 |

(Continued)

FOREIGN PATENT DOCUMENTS

| CN | 101562833 A | 10/2009 |
|---|---|---|
| CN | 101998439 A | 3/2011 |

(Continued)

OTHER PUBLICATIONS

3GPP TR 38.804 v14.0.0 (Mar. 2017) Study on New Radio Access Technology; Radio Interface Protocol Aspects (Release 14), p. 30.*

(Continued)

*Primary Examiner* — Hashim S Bhatti
(74) *Attorney, Agent, or Firm* — Finnegan, Henderson, Farabow, Garrett & Dunner, L.L.P.

(57) ABSTRACT

A method for measuring cell signal quality, includes: when a first system message carrying measurement configuration information is received, determining, on the basis of the measurement configuration information, a synchronous block signal of each cell to be measured; measuring the quality of the synchronous block signal of each cell to be measured to obtain a measurement result corresponding to the cell to be measured; and transmitting a measurement report message to a base station, the measurement report message carrying the measurement result.

18 Claims, 7 Drawing Sheets

(56) References Cited

U.S. PATENT DOCUMENTS

2020/0059930 A1* 2/2020 Lee .................. H04W 72/048
2020/0383014 A1* 12/2020 Chen ................. H04L 5/0051

FOREIGN PATENT DOCUMENTS

| CN | 105338566 A | 2/2016 |
|---|---|---|
| WO | WO 2016/020750 A2 | 2/2016 |

OTHER PUBLICATIONS

3GPP TSG RAN WGl Meeting #89, Title: RRM measurements on IDLE mode RS (R1-1707050) May 15-19, 2017, p. 2.*

English version of International Search Report of PCT Application No. PCT/CN2017/088082, dated Feb. 26, 2018, issued by the ISA—State Intellectual Property Office of the P.R. China.

English version of the Written Opinion of the International Searching Authority of PCT Application No. PCT/CN2017/088082, dated Feb. 26, 2018.

First Office Action dated Apr. 3, 2019, in counterpart Chinese Application No. 201780000503.0 and English translation thereof.

Extended European Search Report for Application No. 17913921.7, dated Jan. 14, 2020.

"3rd Generation Partnership Project; Technical Specification Group Radio Access Network; Study on New Radio Access Technology; Radio Interface Protocol (Release 14)", 3GPP TR 38.804, V14.0.0, Mar. 2017, pp. 1-57.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 1-252.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 253-362.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 363-474.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 475-656.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 657-721.

NTT DOCOMO: "WF on measurement based on SS block", 3GPP Draft; R1-1709412, 3GPP TSG RAN WG1, Meeting #89, Hangzhou, China; May 15-19, 2017, Retrieved from the Internet: URL:http://www.3gpp.org/ftp/tsg_ran/WG1_RL1/TSGR1_89/Docs/, retrieved on May 17, 2017, 7 pages.

ZTE: "RRM measurements on IDLE mode RS", 3GPP Draft; R1-1707050, 3GPP TSG RAN WG1 Meeting #89, Hangzhou, China; May 15-19, 2017, Retrieved from the Internet: URL:http://www.3gpp.org/ftp/Meetings_3GPP_SYNC/RAN1/Docs/, retrieved on May 14, 2017, 8 pages.

* cited by examiner

METHODS AND DEVICES FOR MEASURING CELL SIGNAL QUALITY

CROSS-REFERENCE TO RELATED APPLICATIONS

This is a continuation application of International Application No. PCT/CN2017/088082, filed on Jun. 13, 2017, the contents of which are hereby incorporated by reference in its entirety.

BACKGROUND

In a Long Term Evolution (LTE) omnidirectional transmission system, user equipment (UE) may measure a reference signal receiving power (RSRP) of a cell-specific reference signal (CRS) to measure cell signal quality.

In related art, in researches and discussions of 5th Generation (5G) projects, there is no full-bandwidth CRS designed in LTE, and thus a new measurement configuration solution is needed in a 5G system. For example, for UE in a connected state, a specific reference signal may be configured to measure quality of a service channel; while for UE in an inactive state and an idle state, there is no corresponding measurement configuration solution provided in the related art. Therefore, a new measurement solution in the 5G system is needed to solve a problem about cell signal quality measurement of the UE in the inactive state or the idle state.

SUMMARY

Embodiments of the present disclosure provide cell signal quality measurement methods and devices, to enable UE in an inactive state or an idle state in a 5G system to accurately measure cell signal quality based on a synchronization block.

According to a first aspect of the embodiments of the present disclosure, a cell signal quality measurement method includes that: after a first system message containing measurement configuration information is received, a synchronization block signal of each cell to be measured is determined based on the measurement configuration information; quality measurement is performed on the synchronization block signal of each cell to be measured to obtain a measurement result corresponding to the cell to be measured; and a measurement report message is sent to a base station, the measurement report message containing the measurement result.

According to a second aspect of the embodiments of the present disclosure, a cell signal quality measurement method includes that: a synchronization block signal of each cell to be measured is determined; a first system message is generated based on the synchronization block signal of each cell to be measured, the first system message containing a synchronization block signal of a common cell to be measured of all UEs capable of monitoring the first system message; and the first system message is sent.

According to a third aspect of the embodiments of the present disclosure, UE includes: a processor; and a memory configured to store instructions executable by the processor, wherein the processor may be configured to: after a first system message containing measurement configuration information is received, determine a synchronization block signal of each cell to be measured based on the measurement configuration information; perform quality measurement on the synchronization block signal of each cell to be measured to obtain a measurement result corresponding to the cell to be measured; and send a measurement report message to a base station, the measurement report message containing the measurement result.

According to a fourth aspect of the embodiments of the present disclosure, a base station includes: a processor; and a memory configured to store instructions executable by the processor, wherein the processor may be configured to: determine a synchronization block signal of each cell to be measured; generate a first system message based on the synchronization block signal of each cell to be measured, the first system message containing a synchronization block signal of a common cell to be measured of all UEs capable of monitoring the first system message; and send the first system message.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
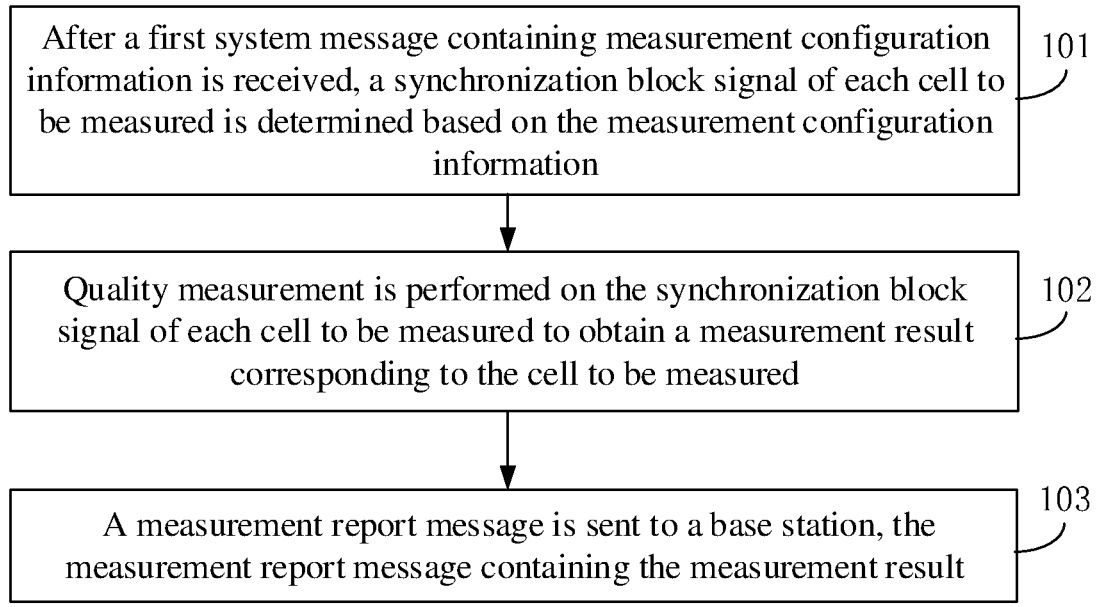
FIG. 1A is a flow chart illustrating a cell signal quality measurement method, according to an exemplary embodiment.
Figure 1B:
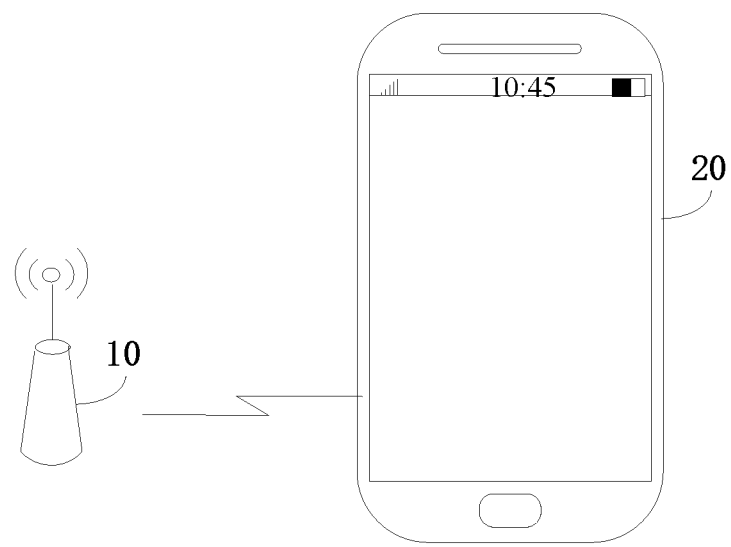
FIG. 1B is a scenario diagram of a cell signal quality measurement method, according to an exemplary embodiment.
Figure 1C:
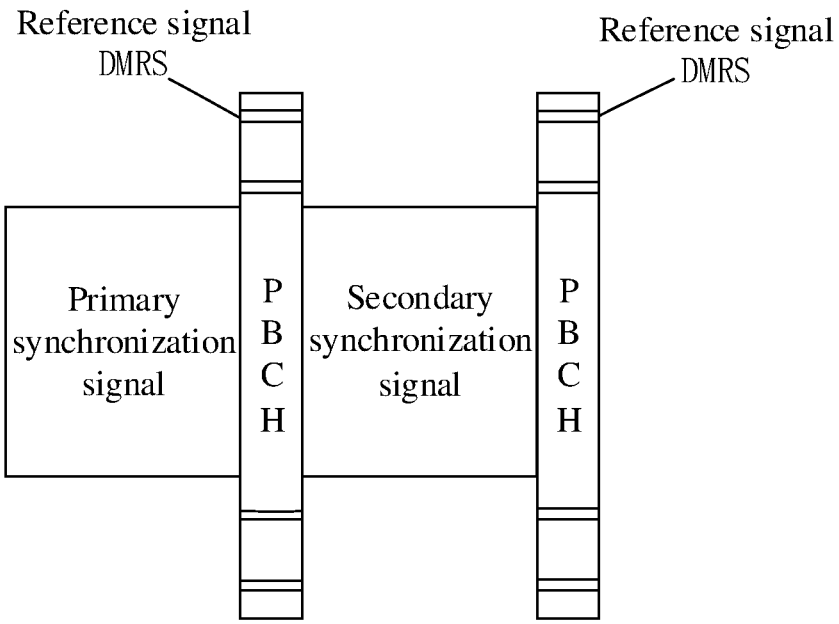
FIG. 1C is a structure diagram of a synchronization block used in a cell signal quality measurement method, according to an exemplary embodiment.

FIG. 1A is a flow chart illustrating a cell signal quality measurement method, according to an exemplary embodiment. FIG. 1B is a scenario diagram of a cell signal quality measurement method, according to an exemplary embodiment. FIG. 1C is a structure diagram of a synchronization block used in the cell signal quality measurement method, according to an exemplary embodiment. The cell signal quality measurement method may be applied to UE. As illustrated in FIG. 1A, the cell signal quality measurement method includes the following Steps 101-103.

In step 101, after a first system message containing measurement configuration information is received, a synchronization block signal of each cell to be measured is determined based on the measurement configuration information.

In an embodiment, the measurement configuration information is configured to indicate a reference required to be measured by the UE for each cell to be measured. For example, for each cell to be measured, a 1-bit reference may be configured in the first system message. It may further be configured that the synchronization block signal of the corresponding cell is a secondary synchronization signal when the 1-bit reference is 0, and that the synchronization block signal of the corresponding cell is the secondary synchronization and a demodulation reference signal (DMRS) in a synchronization block when the 1-bit reference is 1.

In an embodiment, if the measurement configuration information is configured for n cells to be measured in the first system message, n bits are correspondingly used.

In an embodiment, the first system message may contain measurement configuration information for a common neighbor cell and present cell of UE in a certain direction.

In an embodiment, a structure of the synchronization block is shown in FIG. 1C, and includes a primary synchronization signal, the secondary synchronization signal, physical broadcast channel (PBCH) indication information, and the DMRS arranged alternately with the PBCH indication information on a frequency domain. In an embodiment, the DMRS may usually be a cyclic shift sequence generated by a Zadoff-Chu (ZC) sequence generation algorithm.

In step 102, quality measurement is performed on the synchronization block signal of each cell to be measured to obtain a measurement result corresponding to the cell to be measured.

In an embodiment, the measurement result of each cell to be measured may be obtained by measuring signal receiving power of the synchronization block signal.

Figure 2A:
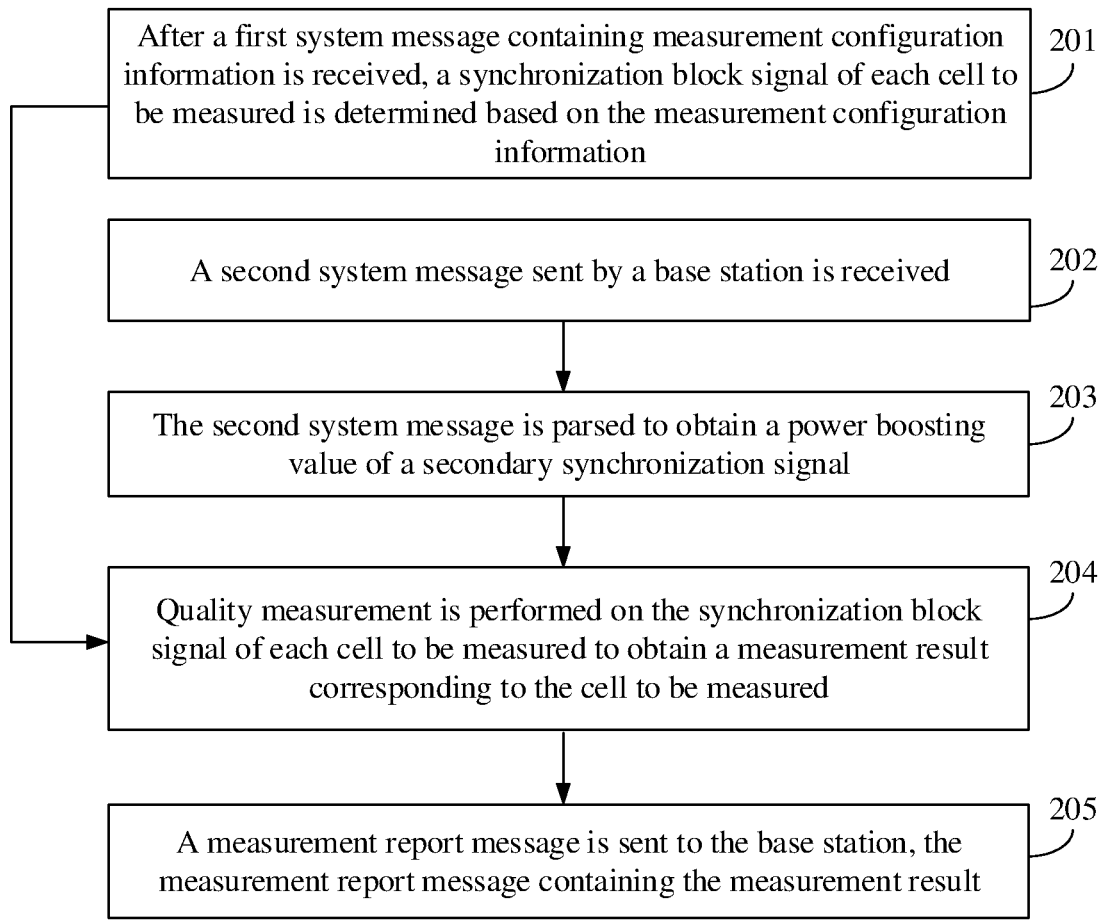
FIG. 2A is a flow chart illustrating a cell signal quality measurement method, according to an exemplary embodiment.
Figure 2B:
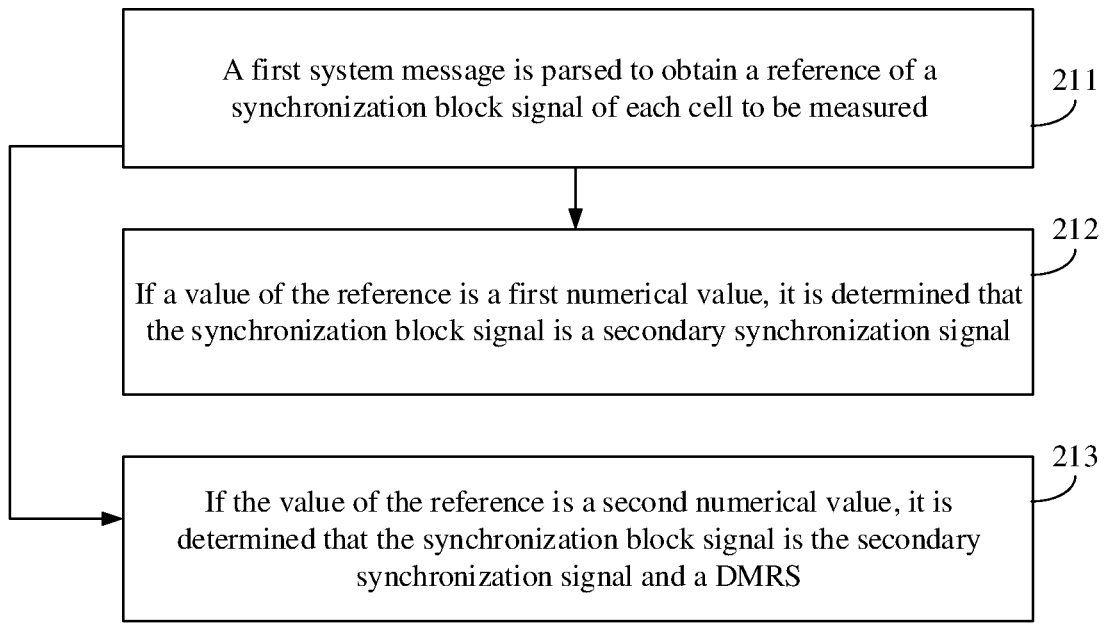
FIG. 2B is a flow chart illustrating a method for determining a synchronization block signal of each cell to be measured in the embodiment illustrated in FIG. 2A.
Figure 2C:
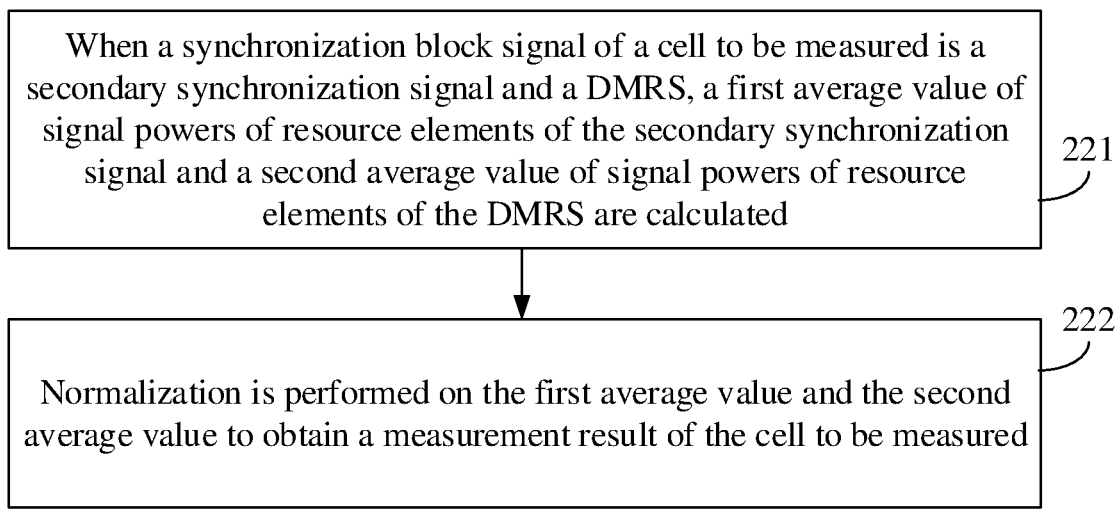
FIG. 2C is a flow chart illustrating a method for performing quality measurement on a synchronization block signal of each cell to be measured in the embodiment illustrated in FIG. 2A.

In an embodiment, quality measurement is performed on the synchronization block signal of each cell to be measured to obtain the measurement result corresponding to the cell to be measured when the synchronization block signal includes the secondary synchronization signal and the DMRS, as illustrated in FIG. 2C. When the synchronization block signal is the secondary synchronization signal, the signal receiving power of the synchronization block signal of each cell to be measured may be directly measured to obtain the measurement result.

In step 103, a measurement report message is sent to a base station, the measurement report message containing the measurement result.

An exemplary scenario is illustrated in FIG. 1B. The scenario illustrated in FIG. 1B includes a base station 10 and UE 20 (for example, a smart phone and a tablet computer). The base station 10 may indicate a synchronization block signal through a first system message, and the UE 20, when receiving the first system message, may determine the synchronization block signal and further measure signal quality of a cell to be measured based on the synchronization block signal.

According to the embodiment, through step 101 to step 103, the base station may flexibly set the synchronization block signal based on a cell network coverage condition, which may not only improve cell signal quality measurement accuracy but also solve the problems of high measurement complexity, high power consumption and the like caused by measurement of the UE over multiple reference signals in any cell.

In an embodiment, the operation that the synchronization block signal of each cell to be measured is determined includes that: the first system message is parsed to obtain a reference of the synchronization block signal of each cell to be measured; if a value of the reference is a first numerical value, it is determined that the synchronization block signal is a secondary synchronization signal; and if the value of the reference is a second numerical value, it is determined that the synchronization block signal includes the secondary synchronization signal and a DMRS.

In an embodiment, the operation that quality measurement is performed on the synchronization block signal of each cell to be measured to obtain the measurement result corresponding to the cell to be measured includes that: when the synchronization block signal of the cell to be measured includes the secondary synchronization signal and the DMRS, a first average value of signal powers of resource elements of the secondary synchronization signal and a second average value of signal powers of resource elements of the DMRS are calculated; and normalization is performed on the first average value and the second average value to obtain the measurement result of the cell to be measured.

In an embodiment, the operation that normalization is performed on the first average value and the second average value to obtain the measurement result of the cell to be measured includes that: a weight of the secondary synchronization signal relative to the DMRS is determined based on a power boosting value of the secondary synchronization signal, a number of the resource elements of the secondary synchronization signal and a number of the resource elements of the DMRS; and the measurement result of the cell to be measured is calculated based on the weight, the first average value and the second average value.

In an embodiment, the cell signal quality measurement method may further include that: a second system message sent by the base station is received; and the second system message is parsed to obtain the power boosting value of the secondary synchronization signal.

In an embodiment, the cell signal quality measurement method may further include that: a measurement control message is received in a radio resource control (RRC) signaling flow for access to a present cell; a synchronization block signal of at least one cell to be measured other than the cell to be measured which is determined based on the first system message is determined based on the measurement control message; and the operation of performing quality measurement on the synchronization block signal of each cell to be measured is executed.

The technical solutions provided in the embodiments of the present disclosure will be described below with specific embodiments.

FIG. 2A is a flow chart illustrating a cell signal quality measurement method, according to an exemplary embodiment. FIG. 2B is a flow chart illustrating a method for determining a synchronization block signal of each cell to be measured in the embodiment illustrated in FIG. 2A. FIG. 2C is a flow chart illustrating a method for performing quality measurement on a synchronization block signal of each cell to be measured in the embodiment illustrated in FIG. 2A. Based on the method described above regarding how the UE measures the cell signal quality, the method in FIG. 2A includes the following steps.

In step 201, after a first system message containing measurement configuration information is received, a synchronization block signal of each cell to be measured is determined based on the measurement configuration information, and step 204 is executed.

In an embodiment, step 201 may include the following steps 211-213 illustrated in FIG. 2B.

In step 211, the first system message is parsed to obtain a reference of the synchronization block signal of each cell to be measured.

In an embodiment, the reference of the synchronization block signal of each cell to be measured occupies 1 bit of data, and a value of the reference may be 1 or 0.

In step 212, if a value of the reference is a first numerical value, it is determined that the synchronization block signal is a secondary synchronization signal.

In an embodiment, the first numerical value may be 0 or 1, and the specific numerical value may be predetermined by a system.

In step 213, if the value of the reference is a second numerical value, it is determined that the synchronization block signal includes the secondary synchronization signal and a DMRS.

In an embodiment, the second numerical value may be 0 or 1, and the specific numerical value may be predetermined by the system. The first numerical value and the second numerical value may be set as follows: the first numerical value is 0 and the second numerical value is 1; or, the first numerical value is 1 and the second numerical value is 0.

Referring back to FIG. 2A, in step 202, a second system message sent by a base station is received.

In an embodiment, the base station, when boosting is performed on transmit power of a secondary synchronization signal in a present cell or a neighbor cell, sends the second system message to the UE, the second system message containing a power boosting value of the cell where boosting is performed on the transmit power of the secondary synchronization signal. For example, if an original power value of the secondary synchronization signal is M and the power boosting value is 2*M, the transmit power of the secondary synchronization signal is 3*M.

In an embodiment, the power boosting value of each cell may be the same and may also be different. A magnitude of the power boosting value is not limited in the present disclosure.

In step 203, the second system message is parsed to obtain a power boosting value of the secondary synchronization signal, and step 204 is executed.

In step 204, quality measurement is performed on the synchronization block signal of each cell to be measured to obtain a measurement result corresponding to the cell to be measured.

In an embodiment, when the synchronization block signal includes the secondary synchronization signal and the DMRS, the measurement result may be obtained based on the embodiment illustrated in FIG. 2C. As illustrated in FIG. 2C, the following steps are included.

In step 221, when the synchronization block signal of the cell to be measured includes the secondary synchronization signal and the DMRS, a first average value of signal powers of resource elements of the secondary synchronization signal and a second average value of signal powers of resource elements of the DMRS are calculated.

In an embodiment, a traditional method known by one of ordinary skill in the art for calculating the average value of the signal power of each resource element may be used.

In step 222, normalization is performed on the first average value and the second average value to obtain the measurement result of the cell to be measured.

In an embodiment, the operation that normalization is performed on the first average value and the second average value includes that: a weight of the secondary synchronization signal relative to the DMRS is determined based on the power boosting value of the secondary synchronization signal, a number of the resource elements of the secondary synchronization signal and a number of the resource elements of the DMRS; and the measurement result of the cell to be measured is calculated based on the weight, the first average value and the second average value. For example, if the number of the resource elements of the secondary synchronization signal is 144, the first average value is M, the power boosting value is ½ of the original power, the number of the resource elements of the DMRS is 72 and the second average value is N, the weight of the secondary synchronization signal relative to the DMRS is 144×(1+½)/72=3 and the measurement result is (3×M+N)/(3+1)=(3×M+N)/4. In addition, if power boosting is not performed on the secondary synchronization signal, the weight of the secondary synchronization signal relative to the DMRS is 144/72=2 and the measurement result is (2*M+N)/3.

In an embodiment, when the synchronization block signal is the secondary synchronization signal, signal receiving power of the synchronization block signal of each cell to be measured may be directly measured to obtain the measurement result.

Referring back to FIG. 2A, in step 205, a measurement report message is sent to the base station, the measurement report message containing the measurement result.

In the embodiment, through step 201 to step 205, when the synchronization block signal includes the secondary synchronization signal and the DMRS, signal receiving power of the secondary synchronization signal and the DMRS is calculated and normalized to obtain the measurement result of measurement over signal quality of the cell to be measured. In such a manner, even though there are more than two types of synchronization block signals to be measured, only one value may be reported, so that control information of the system for cell signal quality measurement is saved. In addition, when boosting is performed on the transmit power of the secondary synchronization signal, the UE may be notified through the second system message such that the UE may perform normalization on the signal receiving power of the secondary synchronization signal and the DMRS to obtain the final measurement result.

Figure 3:
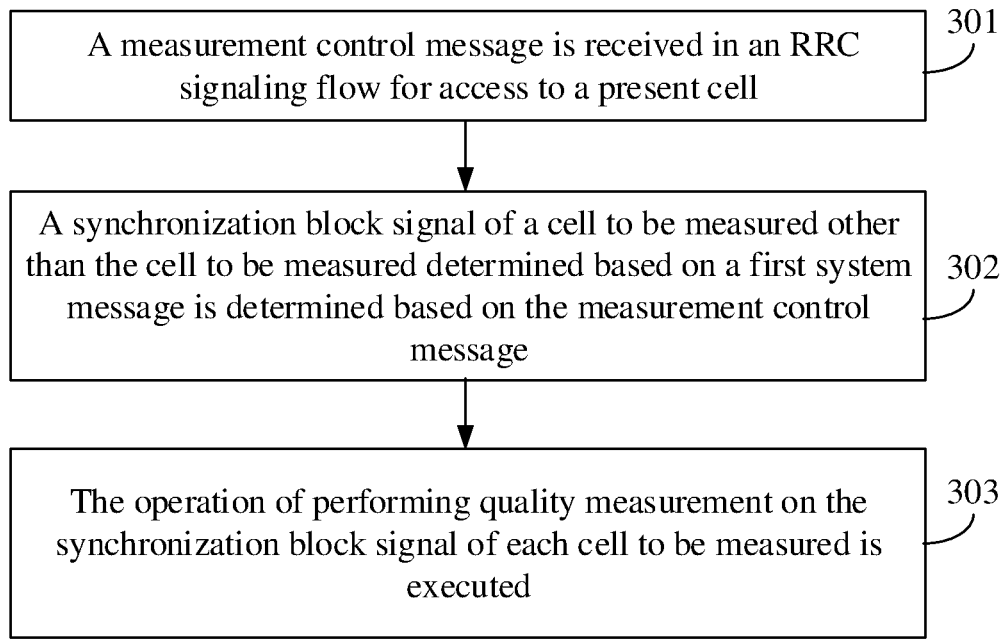
FIG. 3 is a flow chart illustrating a cell signal quality measurement method, according to an exemplary embodiment.

FIG. 3 is a flow chart illustrating a cell signal quality measurement method, according to an exemplary embodiment. In the embodiment, UE performs cell signal measurement based on a measurement control message received in an RRC signaling interaction process for access to a present cell. As illustrated in FIG. 3, the following steps are included.

In step 301, the measurement control message is received in an RRC signaling flow for access to the present cell.

In an embodiment, when the UE accesses the present cell, a base station, if determining that the UE is also required to measure signal quality of more cells besides a cell to be measured set in a first system message, may send the measurement control message to the UE in the RRC signaling flow for access of the UE to the present cell to instruct the UE to measure synchronization block signals to be measured of the other cells to be measured.

In an embodiment, measurement configuration information for a common neighbor cell of the UE in this direction of the cell is usually configured in the first system message, to solve the problem that system message sending efficiency is reduced by configuration of excessive cell information.

In step 302, a synchronization block signal of a cell to be measured, other than the cell to be measured determined based on a first system message, is determined based on the measurement control message.

In an embodiment, the measurement control message may also contain the measurement configuration information configured to indicate the synchronization block signal of the other cell to be measured.

In step 303, the operation of performing quality measurement on the synchronization block signal of each cell to be measured is executed.

In an embodiment, step 303 is performed similar to step 102 in the embodiment illustrated in FIG. 1A.

In the embodiment, the base station may instruct the UE through the measurement control message in the RRC signaling flow to determine the synchronization block signal of the other cell to be measured and further measure signal quality of the cell to be measured based on the synchronization block signal. In such a manner, the base station may flexibly set the synchronization block signal based on a cell network coverage condition, which may not only implement signal quality measurement of the UE over the cell to be measured but also solve the problem that sending efficiency of the first system message is reduced by configuration of excessive cell information in the first system message.

Figure 4:
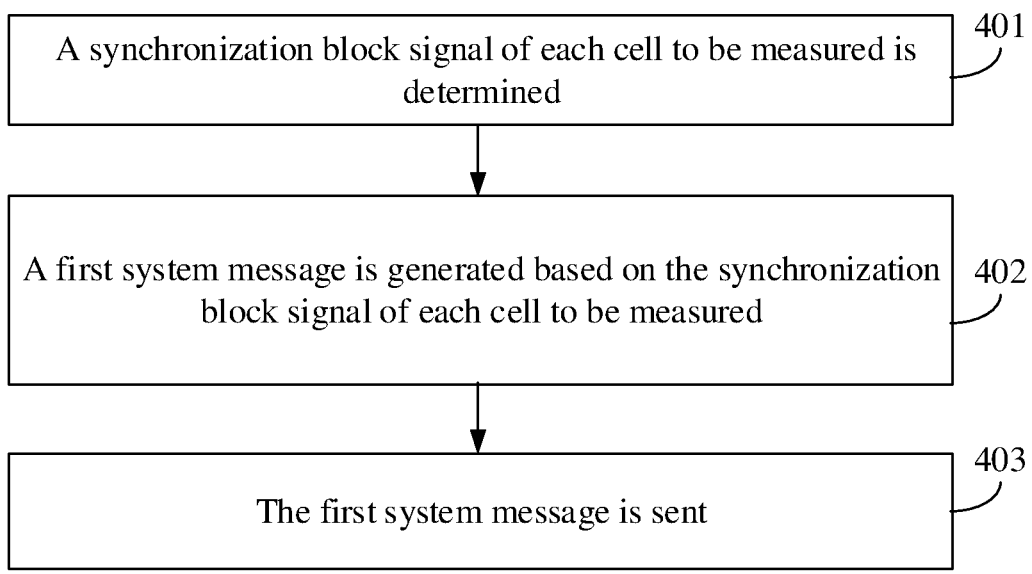
FIG. 4 is a flow chart illustrating a cell signal quality measurement method, according to an exemplary embodiment.

FIG. 4 is a flow chart illustrating a cell signal quality measurement method, according to an exemplary embodiment. The cell signal quality measurement method may be applied to a base station. As illustrated in FIG. 4, the cell signal quality measurement method includes the following steps 401-403.

In step 401, a synchronization block signal of each cell to be measured is determined.

In an embodiment, the synchronization block signal of each cell to be measured may be determined based on network coverage parameters of a cell where UE is located and/or measurement capability supported by the UE.

In an embodiment, the network coverage parameter of the cell may be configured to measure a network coverage condition. For example, a suburb may have a poor network coverage and only secondary synchronization signals may be measured; while a dense urban area may have a strong network coverage and secondary synchronization signals and DMRSs may be measured to obtain more accurate signal quality.

In an embodiment, the measurement capability supported by the UE is determined based on UE capability reported by the UE during network access. For example, some UE only supports measurement of secondary synchronization signals and some UE supports measurement of secondary synchronization signals and DMRSs.

In step 402, a first system message is generated based on the synchronization block signal of each cell to be measured.

In an embodiment, the first system message contains a synchronization block signal of a common cell to be measured of all UEs capable of monitoring the first system message.

In an embodiment, a reference of the synchronization block signal of each cell to be measured occupies 1 bit of data, and a value of the reference may be 1 or 0.

In an embodiment, only a synchronization block signal of a present cell is contained in the first system message; or, the synchronization block signal of the present cell and a synchronization block signal of a common neighbor cell of UE in a certain direction may be contained in the first system message.

In step 403, the first system message is sent.

In an embodiment, when it is determined to perform power boosting on a secondary synchronization signal of the present cell or the neighbor cell, a second system message may be sent, the second system message containing a power boosting value of the secondary synchronization signal, such that the UE, when measuring cell signal quality through the secondary synchronization signal and a DMRS based on the power boosting value, may perform normalization in the embodiment illustrated in FIG. 2A.

An exemplary scenario is illustrated in FIG. 1B. The scenario illustrated in FIG. 1B includes a base station 10 and UE 20 (for example, a smart phone and a tablet computer). The base station 10 may indicate a synchronization block signal through a first system message, and the UE 20, when receiving the first system message, may determine the synchronization block signal and further measure signal quality of a cell to be measured based on the synchronization block signal.

According to the embodiment, through step 401 to step 403, the base station may flexibly set the synchronization block signal based on a cell network coverage condition, which may not only improve cell signal quality measurement accuracy but also solve the problems of high measurement complexity, high power consumption and the like caused by measurement of the UE over multiple reference signals in any cell.

In an embodiment, the operation that the synchronization block signal of each cell to be measured is determined includes that: the synchronization block signal of each cell to be measured is determined based on network coverage parameters of a cell where the UE is located and/or a measurement capability supported by the UE.

In an embodiment, the measurement capability supported by the UE is determined based on UE capability reported by the UE during network access.

In an embodiment, the cell signal quality measurement method may further include that: a measurement control message is generated based on the synchronization block signal of each cell to be measured, the measurement control message containing at least one synchronization block signal of a cell to be measured except the common cell to be measured indicated in the first system message.

In an embodiment, the cell signal quality measurement method may further include that: when power boosting is performed on a secondary synchronization signal in a present cell or a neighbor cell, a second system message is sent, the second system message containing a power boosting value of the secondary synchronization signal.

The technical solutions provided in the embodiments of the present disclosure will be described below with specific embodiments.

Figure 5:
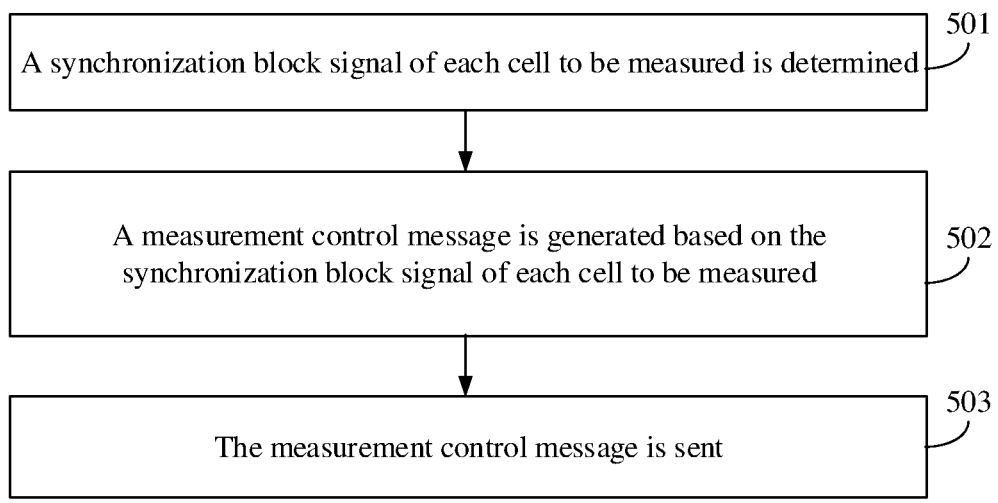
FIG. 5 is a flow chart illustrating a cell signal quality measurement method, according to an exemplary embodiment.

FIG. 5 is a flow chart illustrating a cell signal quality measurement method, according to an exemplary embodiment In the embodiment, a measurement control message is sent based on an RRC signaling flow with UE to instruct the UE for cell signal measurement. As illustrated in FIG. 5, the following steps are included.

In step 501, a synchronization block signal of each cell to be measured is determined.

In step 502, a measurement control message is generated based on the synchronization block signal of each cell to be measured.

In an embodiment, a base station, if determining that the UE is also required to measure signal quality of more cells besides a cell to be measured set in a first system message, may further generate the measurement control message, the measurement control message containing a synchronization block signal of a cell to be measured except the common cell to be measured indicated in the first system message.

In step 503, the measurement control message is sent.

In the embodiment, through step 501 to step 503, the base station may instruct the UE through the measurement control message in the RRC signaling flow to determine the synchronization block signal of the other cell to be measured and further measure signal quality of the cell to be measured based on the synchronization block signal. In such a manner, the base station may flexibly set the synchronization block signal based on a cell network coverage condition, which may not only implement signal quality measurement of the UE over the cell to be measured but also solve the problem that sending efficiency of the first system message is reduced by configuration of excessive cell information in the first system message.

The technical solutions provided by the embodiments of the present disclosure may have the following beneficial effects.

The base station may indicate the synchronization block signal through the first system message, and the UE, when receiving the first system message, may determine the synchronization block signal and further measure signal quality of the cell to be measured based on the synchronization block signal. Therefore, the base station may flexibly set the synchronization block signal based on a cell network coverage condition, which may not only improve cell signal quality measurement accuracy but also solve the problems of high measurement complexity, high power consumption and the like caused by measurement of the UE over multiple reference signals in any cell.

Figure 6:
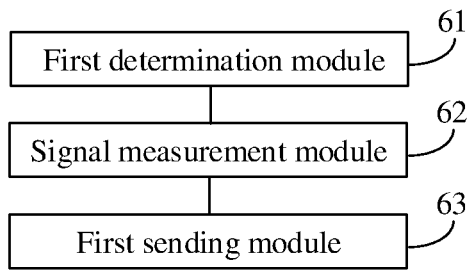
FIG. 6 is a block diagram of a cell signal quality measurement device, according to an exemplary embodiment.

FIG. 6 is a block diagram of a cell signal quality measurement device, according to an exemplary embodiment. The device is applied to UE. As illustrated in FIG. 6, the cell signal quality measurement device includes: a first determination module 61, configured to, after a first system message containing measurement configuration information is received, determine a synchronization block signal of each cell to be measured based on the measurement configuration information; a signal measurement module 62, configured to perform quality measurement on the synchronization block signal, determined by the first determination module 61, of each cell to be measured to obtain a measurement result corresponding to the cell to be measured; and a first sending module 63, configured to send a measurement report message to a base station, the measurement report message containing the measurement result obtained by the signal measurement module 62.

Figure 7:
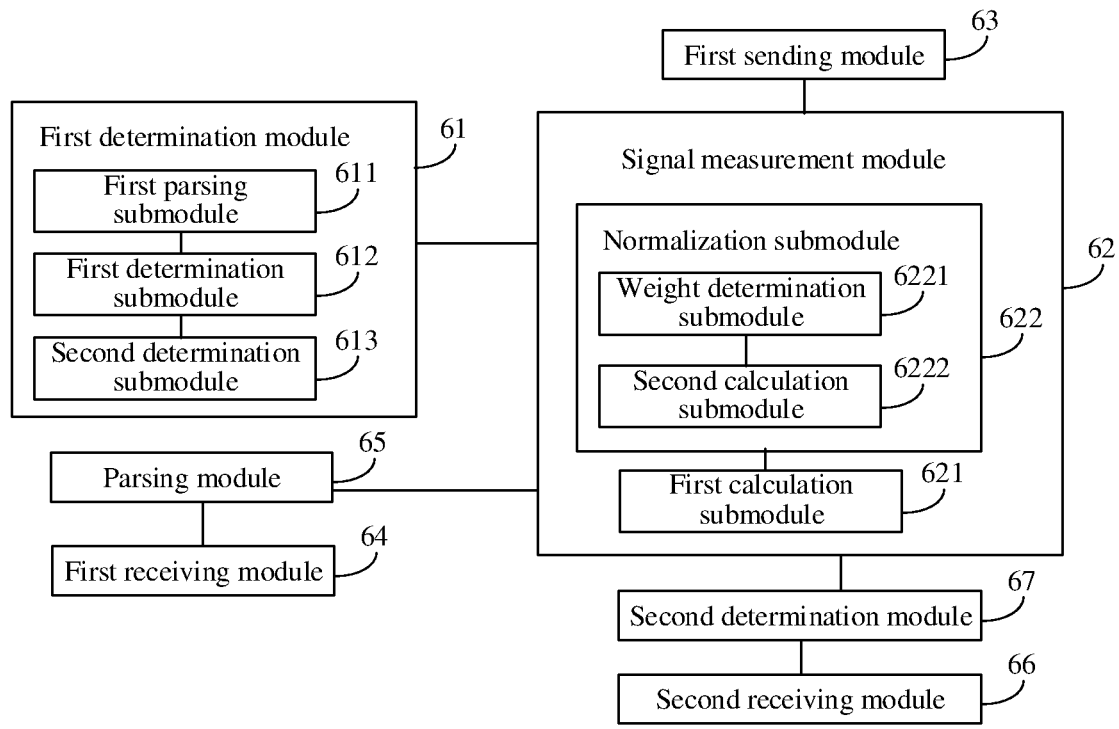
FIG. 7 is a block diagram of a cell signal quality measurement device, according to an exemplary embodiment.

FIG. 7 is a block diagram of a cell signal quality measurement device, according to an exemplary embodiment. As illustrated in FIG. 7, based on the embodiment illustrated in FIG. 6, the first determination module 61 includes: a first parsing submodule 611, configured to parse the first system message to obtain a reference of the synchronization block signal of each cell to be measured; a first determination submodule 612, configured to, if a value of the reference obtained by the first parsing submodule 611 is a first numerical value, determine that the synchronization block signal is a secondary synchronization signal; and a second determination submodule 613, configured to, if a value of the reference obtained by the first parsing submodule 611 is a second numerical value, determine that the synchronization block signal includes the secondary synchronization signal and a DMRS.

In an embodiment, the signal measurement module 62 includes: a first calculation submodule 621, configured to, when the synchronization block signal of the cell to be measured includes the secondary synchronization signal and the DMRS, calculate a first average value of signal powers of resource elements of the secondary synchronization signal and a second average value of signal powers of resource elements of the DMRS; and a normalization submodule 622, configured to perform normalization on the first average value and second average value calculated by the first calculation submodule to obtain the measurement result of the cell to be measured.

In an embodiment, the normalization submodule 622 includes: a weight determination submodule 6221, configured to determine a weight of the secondary synchronization signal relative to the DMRS based on a power boosting value of the secondary synchronization signal, a number of the resource elements of the secondary synchronization signal and a number of the resource elements of the DMRS; and a second calculation submodule 6222, configured to calculate the measurement result of the cell to be measured based on the weight determined by the weight determination submodule 6221, the first average value and the second average value.

In an embodiment, the device further includes: a first receiving module 64, configured to receive a second system message sent by the base station; and a parsing module 65, configured to parse the second system message to obtain the power boosting value of the secondary synchronization signal.

In an embodiment, the device further includes: a second receiving module 66, configured to receive a measurement control message in an RRC signaling flow for access to a present cell; and a second determination module 67, configured to determine a synchronization block signal of at least one cell to be measured other than the cell to be measured which is determined based on the first system message based on the measurement control message received by the second receiving module 66, wherein the signal measurement module 62 is configured to execute the operation of performing quality measurement on the synchronization block signal of each cell to be measured.

Figure 8:
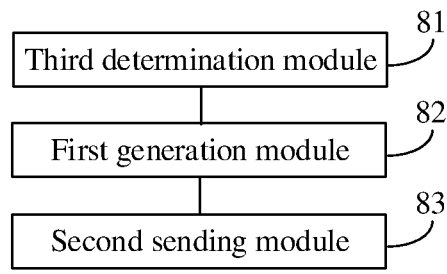
FIG. 8 is a block diagram of a cell signal quality measurement device, according to an exemplary embodiment.

FIG. 8 is a block diagram of a cell signal quality measurement device, according to an exemplary embodiment. The device is applied to a base station. As illustrated in FIG. 8, the cell signal quality measurement device includes: a third determination module 81, configured to determine a synchronization block signal of each cell to be measured; a first generation module 82, configured to generate a first system message based on the synchronization block signal, determined by the third determination module 81, of each cell to be measured, the first system message containing a synchronization block signal of a common cell to be measured of all UEs capable of monitoring the first system message; and a second sending module 83, configured to send the first system message generated by the first generation module 82.

Figure 9:
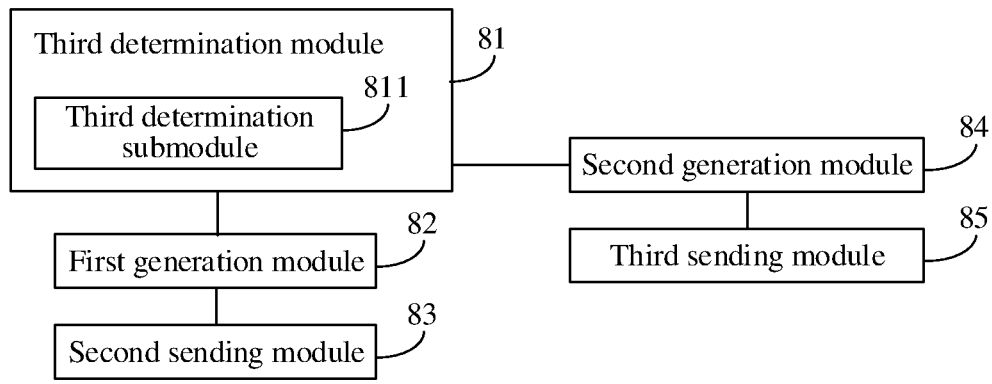
FIG. 9 is a block diagram of a cell signal quality measurement device, according to an exemplary embodiment.

FIG. 9 is a block diagram of a cell signal quality measurement device, according to an exemplary embodiment. As illustrated in FIG. 9, based on the embodiment illustrated in FIG. 8, the third determination module 81 includes: a third determination submodule 811, configured to determine the synchronization block signal of each cell to be measured based on network coverage parameters of a cell where the UE is located and/or measurement capability supported by the UE.

In an embodiment, the measurement capability supported by the UE is determined based on a UE capability reported by the UE during network access.

In an embodiment, the device further includes: a second generation module 84, configured to generate a measurement control message based on the synchronization block signal of each cell to be measured, the measurement control message containing a synchronization block signal of a cell to be measured except the common cell to be measured indicated in the first system message.

In an embodiment, the device further includes: a third sending module 85, configured to, when power boosting is performed on a secondary synchronization signal in a present cell or a neighbor cell, send a second system message, the second system message containing a power boosting value of the secondary synchronization signal.

With respect to the device in the above embodiment, the specific manners for performing operations for individual modules therein have been described in detail in the embodiment regarding the method, which will not be elaborated herein.

Figure 10:
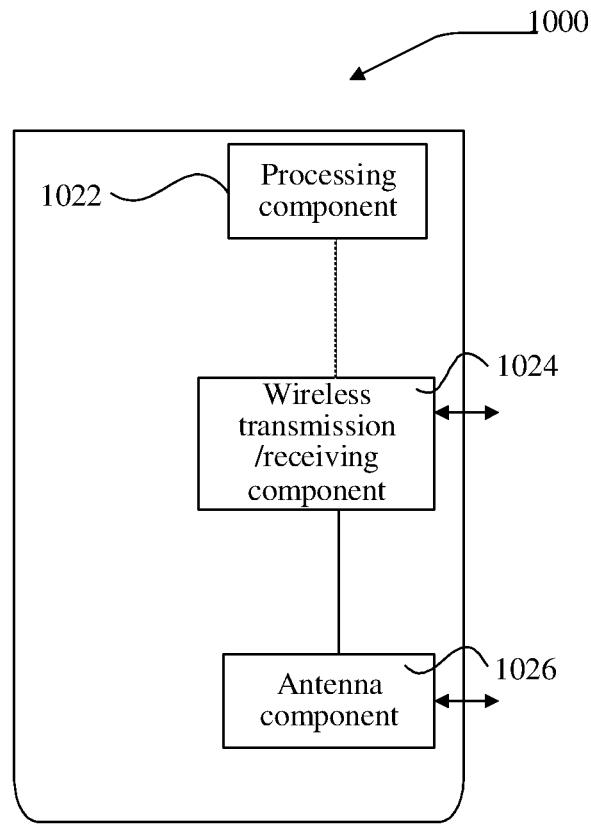
FIG. 10 is a block diagram of a device applied to measurement of cell signal quality, according to an exemplary embodiment.

FIG. 10 is a block diagram of a device 1000 for measuring cell signal quality, according to an exemplary embodiment. The device 1000 may be provided as a base station. Referring to FIG. 10, the device 1000 includes a processing component 1022, a wireless transmission/receiving component 1024, an antenna component 1026 and a wireless interface-specific signal processing part, and the processing component 1022 may further include one or more processors. The processing component 1022 may be configured to execute the above described cell signal quality measurement method.

In an exemplary embodiment, there is also provided a non-transitory computer-readable storage medium including an instruction, and the instruction may be executed by the processing component 1022 of the device 1000 to implement the method described above. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 11:
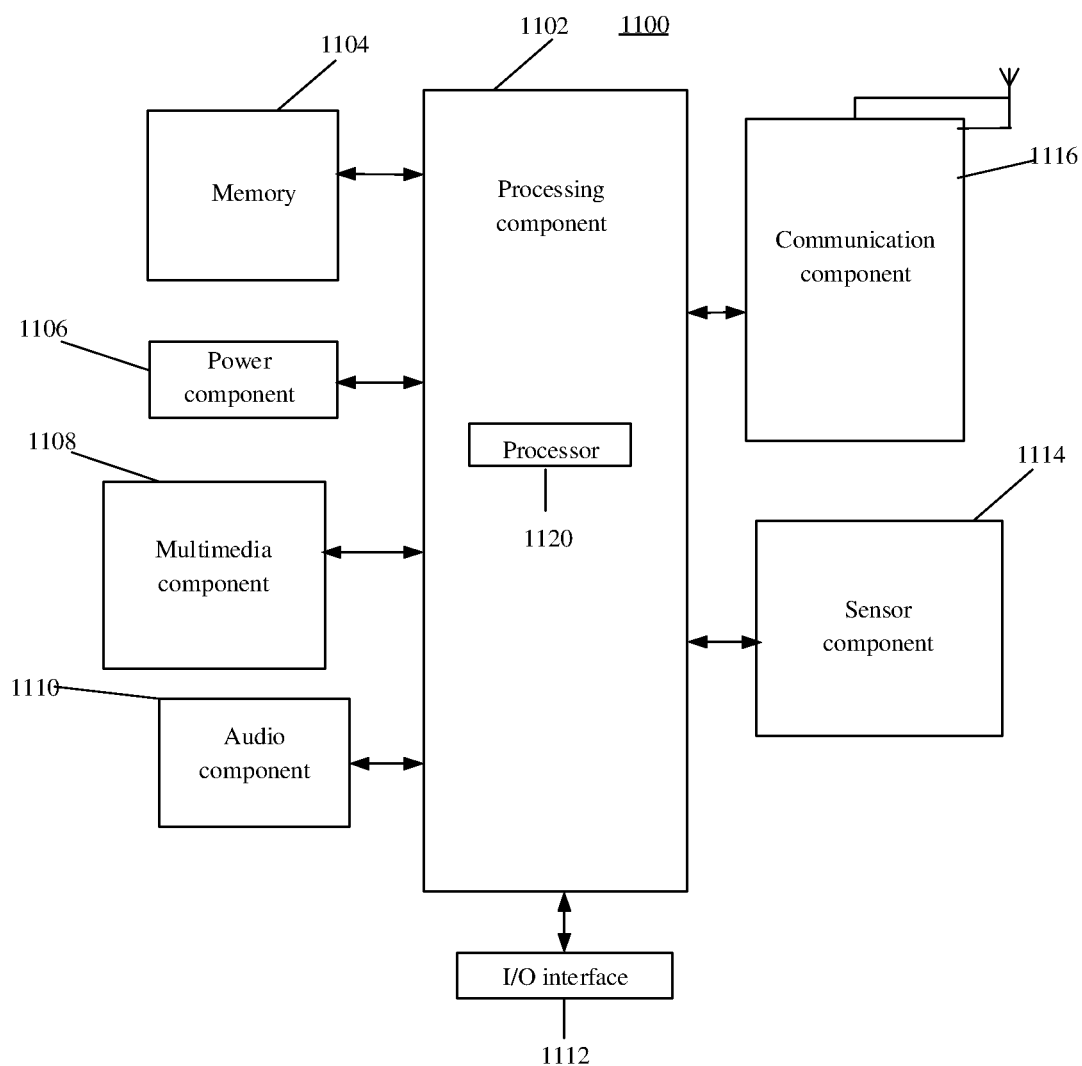
FIG. 11 is a block diagram of a device applied to measurement of cell signal quality, according to an exemplary embodiment.

FIG. 11 is a block diagram of a device 1100 for measuring cell signal quality, according to an exemplary embodiment. For example, the device 1100 may be, for example, a smart phone.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions for any application programs or methods operated on the device 1100, messages, pictures, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the device 1100. The power component 1106 may include a power management system, one or more power supplies, and other components associated with generation, management and distribution of power for the device 1100.

The multimedia component 1108 includes a screen providing an output interface between the device 1100 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the device 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a distance sensor, a pressure sensor or a temperature sensor.

The communication component 1116 is configured to facilitate wired or wireless communication between the device 1100 and another device. The device 1100 may access a communication-standard-based wireless network, such as a Wireless Fidelity (WIFI) network, a 4th-Generation (4G) or 5th-Generation (5G) network or a combination thereof. In an exemplary embodiment, the communication component 1116 receives a broadcast signal or broadcast associated information from an external broadcast management system through a broadcast channel. In an exemplary embodiment, the communication component 1116 further includes a Near Field Communication (NFC) module to facilitate short-range communication. In an exemplary embodiment, the communication component 1116 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the cell signal quality measurement method.

In an exemplary embodiment, there is also provided a non-transitory computer-readable storage medium including an instruction, such as the memory 1104 including an instruction, and the instruction may be executed by the processor 1120 of the device 1100 to implement the method described according to the first aspect. For example, the non-transitory computer-readable storage medium may be a ROM, a RAM, a D-ROM, a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for user equipment to perform cell signal quality measurement, comprising:
    after a first system message containing measurement configuration information is received, determining a synchronization block signal of each cell to be measured based on the measurement configuration information;
    performing quality measurement on the synchronization block signal of each cell to be measured to obtain a measurement result corresponding to the cell to be measured; and
    sending a measurement report message to a base station, the measurement report message containing the measurement result,
    wherein the method further comprises:
    receiving a measurement control message in a radio resource control (RRC) signaling flow for access to a present cell;
    determining, based on the measurement control message, a synchronization block signal of at least one cell to be measured other than each cell to be measured which is determined based on the first system message; and
    performing quality measurement on the synchronization block signal of the at least one cell to be measured.

2. The method of claim 1, wherein determining the synchronization block signal of each cell to be measured comprises:
    analyzing a reference of the synchronization block signal of each cell to be measured from the first system message;
    if a value of the reference is a first numerical value, determining that the synchronization block signal is a secondary synchronization signal; and
    if the value of the reference is a second numerical value, determining that the synchronization block signal includes the secondary synchronization signal and a demodulation reference signal (DMRS).

3. The method of claim 1, wherein performing quality measurement on the synchronization block signal of each cell to be measured to obtain the measurement result corresponding to the cell to be measured comprises:
    when the synchronization block signal of the cell to be measured includes a secondary synchronization signal and a demodulation reference signal (DMRS), calculating a first average value of signal powers of resource elements of the secondary synchronization signal and a second average value of signal powers of resource elements of the DMRS; and
    performing normalization on the first average value and the second average value to obtain the measurement result of the cell to be measured.

4. The method of claim 3, wherein performing normalization on the first average value and the second average value to obtain the measurement result of the cell to be measured comprises:
  determining a weight of the secondary synchronization signal relative to the DMRS based on a power boosting value of the secondary synchronization signal, a number of the resource elements of the secondary synchronization signal, and a number of the resource elements of the DMRS; and
  calculating the measurement result of the cell to be measured based on the weight, the first average value, and the second average value.

5. The method of claim 4, further comprising:
  receiving a second system message sent by the base station; and
  analyzing the power boosting value of the secondary synchronization signal from the second system message.

6. A method for a base station to perform cell signal quality measurement, comprising:
  determining a synchronization block signal of each cell to be measured;
  generating a first system message based on the synchronization block signal of each cell to be measured, the first system message containing a synchronization block signal of a common cell, to be measured, of all user equipments (UEs) capable of monitoring the first system message; and
  sending the first system message,
  wherein the method further comprises:
  generating a measurement control message based on the synchronization block signal of each cell to be measured, the measurement control message containing a synchronization block signal of a cell to be measured other than the common cell to be measured indicated in the first system message.

7. The method of claim 6, wherein determining the synchronization block signal of each cell to be measured comprises:
  determining the synchronization block signal of each cell to be measured based on at least one of network coverage parameters of a cell where a UE is located or measurement capability supported by the UE.

8. The method of claim 7, wherein the measurement capability supported by the UE is determined based on UE capability reported by the UE during network access.

9. The method of claim 6, further comprising:
  when power boosting is performed on a secondary synchronization signal in a present cell or a neighbor cell, sending a second system message, the second system message containing a power boosting value of the secondary synchronization signal.

10. A device for cell signal quality measurement, comprising:
  a processor; and
  a memory configured to store instructions executable by the processor,
  wherein the processor is configured to:
  after a first system message containing measurement configuration information is received, determine a synchronization block signal of each cell to be measured based on the measurement configuration information;
  perform quality measurement on the synchronization block signal of each cell to be measured to obtain a measurement result corresponding to the cell to be measured; and
  send a measurement report message to a base station, the measurement report message containing the measurement result,
  wherein the processor is further configured to:
  receive a measurement control message in a radio resource control (RRC) signaling flow for access to a present cell; and
  determine, based on the measurement control message, a synchronization block signal of at least one cell to be measured, other than each cell to be measured which is determined based on the first system message; and
  perform quality measurement on the synchronization block signal of the at least one other cell to be measured.

11. The device of claim 10, wherein the processor is further configured to:
  parse the first system message to obtain a reference of the synchronization block signal of each cell to be measured;
  if a value of the reference is a first numerical value, determine that the synchronization block signal is a secondary synchronization signal; and
  if a value of the reference is a second numerical value, determine that the synchronization block signal includes the secondary synchronization signal and a demodulation reference signal (DMRS).

12. The device of claim 10, wherein the processor is further configured to:
  when the synchronization block signal of the cell to be measured includes a secondary synchronization signal and a demodulation reference signal (DMRS), calculate a first average value of signal powers of resource elements of the secondary synchronization signal and a second average value of signal powers of resource elements of the DMRS; and
  perform normalization on the first average value and second average value to obtain the measurement result of the cell to be measured.

13. The device of claim 12, wherein the processor is further configured to:
  determine a weight of the secondary synchronization signal relative to the DMRS based on a power boosting value of the secondary synchronization signal, a number of the resource elements of the secondary synchronization signal, and a number of the resource elements of the DMRS; and
  calculate the measurement result of the cell to be measured based on the weight, the first average value, and the second average value.

14. The device of claim 13, wherein the processor is further configured to:
  receive a second system message sent by the base station; and
  parse the second system message to obtain the power boosting value of the secondary synchronization signal.

15. A device for cell signal quality measurement, comprising:
  a processor; and
  a memory configured to store instructions executable by the processor,
  wherein the processor is configured to:
  determine a synchronization block signal of each cell to be measured;
  generate a first system message based on the synchronization block signal of each cell to be measured, the first system message containing a synchronization block signal of a common cell, to be measured, of all user equipments (UEs) capable of monitoring the first system message; and send the first system message, wherein the processor is further configured to:

generate a measurement control message based on the synchronization block signal of each cell to be measured, the measurement control message containing a synchronization block signal of a cell to be measured other than the common cell to be measured indicated in the first system message.

16. The device of claim 15, wherein the processor is further configured to:
determine the synchronization block signal of each cell to be measured based on at least one of network coverage parameters of a cell where a UE is located or measurement capability supported by the UE.

17. The device of claim 16, wherein the measurement capability supported by the UE is determined based on UE capability reported by the UE during network access.

18. The device of claim 15, wherein the processor is further configured to:
when power boosting is performed on a secondary synchronization signal in a present cell or a neighbor cell, send a second system message, the second system message containing a power boosting value of the secondary synchronization signal.

* * * * *